United States Patent
Lee et al.

(10) Patent No.: US 11,734,253 B2
(45) Date of Patent: *Aug. 22, 2023

(54) DATABASE CHANGE CAPTURE WITH TRANSACTION-CONSISTENT ORDER

(71) Applicant: SAP SE, Walldorf (DE)

(72) Inventors: Juchang Lee, Seoul (KR); Chang Gyoo Park, Seoul (KR); Hyoung Jun Na, Seoul (KR)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/701,185

(22) Filed: Mar. 22, 2022

(65) Prior Publication Data
US 2022/0215011 A1    Jul. 7, 2022

Related U.S. Application Data

(63) Continuation of application No. 16/851,227, filed on Apr. 17, 2020, now Pat. No. 11,308,070, which is a continuation of application No. 15/944,429, filed on Apr. 3, 2018, now Pat. No. 10,664,465.

(51) Int. Cl.
| | |
|---|---|
| G06F 16/23 | (2019.01) |
| G06F 16/27 | (2019.01) |
| G06F 16/28 | (2019.01) |
| G06F 16/22 | (2019.01) |

(52) U.S. Cl.
CPC ...... *G06F 16/2358* (2019.01); *G06F 16/2282* (2019.01); *G06F 16/27* (2019.01); *G06F 16/284* (2019.01)

(58) Field of Classification Search
CPC .. G06F 16/2358; G06F 16/2282; G06F 16/27; G06F 16/284
See application file for complete search history.

(56) References Cited

U.S. PATENT DOCUMENTS

| | | |
|---|---|---|
| 10,664,465 B2 | 5/2020 | Lee et al. |
| 2003/0009477 A1 | 1/2003 | Wilding |
| 2006/0047684 A1 | 3/2006 | Cherkauer |
| 2008/0034014 A1 | 2/2008 | Beck et al. |
| 2017/0032010 A1 | 2/2017 | Merriman |
| 2017/0177658 A1 | 6/2017 | Lee et al. |
| 2019/0340275 A1 | 11/2019 | Thomsen et al. |
| 2020/0250169 A1 | 8/2020 | Lee et al. |

OTHER PUBLICATIONS

Communication Pursuant to Article 94 (3) EPC issued in European Application No. 19166476.2 dated Apr. 22, 2021, 7 pages.
Extended European Search Report issued in European Application No. 19166476.2 dated Jul. 23, 2019, 10 pages.
Ibase.ru [online], "Interbase 6 Operations Guide" 1999, [retrieved on Apr. 16, 2021], retrieved from: URL <https://www.Ibase.ru/files/interbase/ib6/OpGuide.pdf>, 30 pages.

*Primary Examiner* — William Spieler
(74) *Attorney, Agent, or Firm* — Fish & Richardson P.C.

(57) ABSTRACT

Techniques are described for use in database and data management systems to efficiently capture and replicate changes that occur in database tables. The changes are captured in a transaction-consistent order, and in a format that may easily be searched and accessed using common relational queries.

16 Claims, 8 Drawing Sheets

DATABASE CHANGE CAPTURE WITH TRANSACTION-CONSISTENT ORDER

CLAIM OF PRIORITY

This application claims priority under 35 USC § 120 to U.S. patent application Ser. No. 16/851,227, filed on Apr. 17, 2020, entitled "DATABASE CHANGE CAPTURE WITH TRANSACTION-CONSISTENT ORDER", which claims priority under 35 USC § 120 to U.S. patent application Ser. No. 15/944,429, filed on Apr. 3, 2018, entitled "DATABASE CHANGE CAPTURE WITH TRANSACTION-CONSISTENT ORDER"; now issued as U.S. Pat. No. 10,664,465 on May 26, 2020, the entire contents of each and both are hereby incorporated by reference.

TECHNICAL FIELD

This description relates to change capture for database tables.

BACKGROUND

Databases are generally used to store large quantities of information, in an organized manner that enables fast and convenient searching and other database operations. Often, it is necessary or desirable to capture, replicate, or audit changes that occur in a particular database table.

For example, it may be desirable to replicate changes over time, for purposes of reliability and availability of the data. In particular, replicating data (and associated changes) at a particular source table to one or more target tables at disparate locations makes the data more widely available for potential users, and less susceptible to a particular system failure. In other examples, data change capture may be used to integrate data from multiple sites, for data warehousing and reporting, or for performing audits of database transactions.

Existing techniques for capturing database changes in the above and similar scenarios suffer from various drawbacks. In general, existing techniques require excessive overhead in terms of latency, computational resources, and human resources required for configuration and maintenance. Further, the existing techniques may have limited applicability in heterogeneous environments, such as when change data is required to be replicated across different database systems.

DETAILED DESCRIPTION

Figure 1:
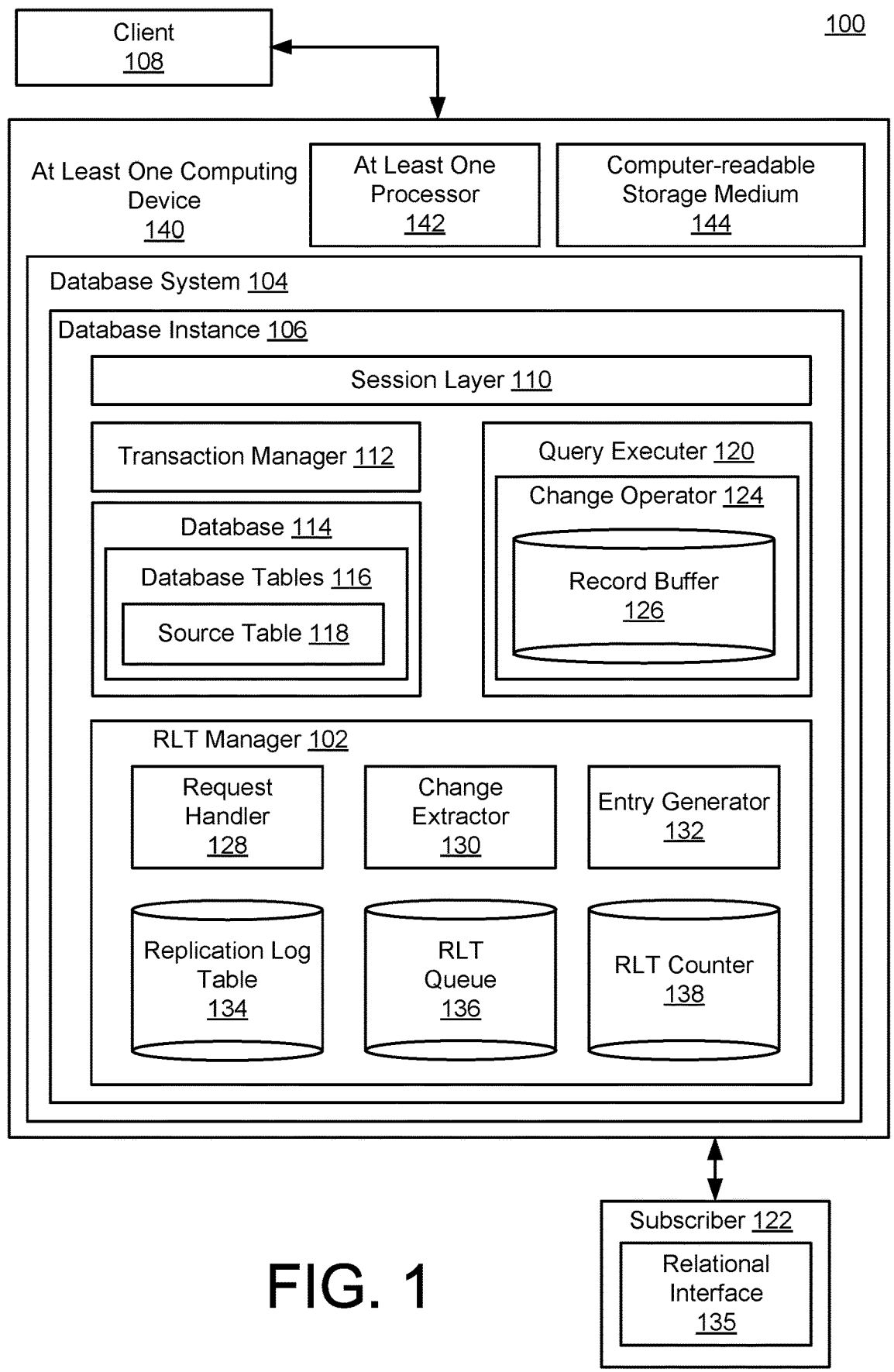
FIG. 1 is a block diagram of a system for database change capture with transaction-consistent order.

FIG. 1 is a block diagram of a system 100 for database change capture with transaction-consistent order. In FIG. 1, a replication log table (RLT) manager 102 is configured to be implemented in the context of a database system 104 to capture database changes occurring within a particular database instance 106, in response to, for example, queries or other requests received from a database client 108.

For example, a query received from the client 108 may be received by a session layer 110 of the database instance 106. The session layer 110 may be configured, for example, to compile the received query, formulate an execution plan for the query within the database instance 106, and ultimately provide a query response, if any, to the client 108.

A transaction manager 112 is configured to implement logistical aspects of resulting interactions with a database 114, and, in particular, with individual database tables 116, such as an example source table 118 from which resulting, captured database changes will be replicated and propagated. A query executor 120 may receive one or more queries from the session layer 110, along with any relevant instructions for the processing thereof that may be received from the transaction manager 112.

In more detail, the transaction manager 112 may be configured to track running and closed transactions, including specific transaction events, such as transaction commits or rollback operations. The transaction manager 112 may also be configured to inform the database 114 with respect to such transaction events, so that the database 114 may execute any associated actions.

Thus, the system 100 generally represents and illustrates simplified scenarios in which various clients, represented by the client 108, are configured to issue a plurality of queries and associated database commands to a single/same instance 106 of the database system 104. The various queries and commands are received at the session layer 110, which, as referenced, may compile or otherwise prepare the various received queries and commands for use by the transaction manager 112 and the query executor 120. The transaction manager 112 and the query executor 120 may thus be configured to access the database 114, and ultimately provide the requested or desired results for each of the client(s) 108.

Following successful completion of a requested database operation, a control flow to execute a transaction commit may be executed. For example, the client 108 may send a commit command to the database instance 106, and the session layer 110 may again interpret or compile the received command. In this case, the received command is a transaction control command, and not, e.g., an SQL statement. Accordingly, the transaction manager 112 may proceed to commit the previously-started transaction.

In general, it will be appreciated that the database system 104 should be understood to represent virtually any database system for which it may be desirable to capture changes occurring within a database table, such as the source table 118. Accordingly, the session layer 110, the transaction manager 112, and the query executor 120 should be generally understood to represent example components provided to illustrate and explain relevant operations of the RLT manager 102. In practice, of course, a particular type of database instance 106 of a given database system 104 may utilize any suitable component, or combination of components, required to process the particular type of query or other request received from the client 108.

As the query executor 120 executes received queries or other change operation requests received from the client 108 with respect to the source table 118, it may be desirable to propagate the resulting changes to a subscriber 122. In general, the subscriber 122 should be understood to represent virtually any entity that may be interested in receiving replicated changes from the source table 118, such as the types of entities referenced above. Depending on the nature of a given usage scenario, the subscriber 122 may receive the replicated, propagated changes and either a push or pull (i.e., active or passive) manner, and/or using real-time, on request, just in time, or batch processing, as described in detail, below, and/or as would be appreciated by one of skill in the art.

In the example of FIG. 1, the query executor 120 is illustrated as executing a change operator 124 that is configured to execute some change with respect to the source table 118. Thus the change operator 124 should be generally understood to represent any operator associated with, e.g., an insert, update, delete, erase, or write operation that may be executed with respect to the source table 118. In many of the examples that follow, the change operator 124 is described as a data manipulation language (DML) operator, which may be used to execute a write event in which new data is added to the source table 118.

In general, although operations of the database system 104 are very fast, particularly considering the volume of data often stored within the database 114, operations of the query executor 120, including implementation of the change operator 124, are not instantaneous. For example, it may occur that multiple requests are received from the client 108, or from a plurality of additional clients (not pictured). Accordingly, it may occur that the source table 118 is locked for access at a particular point in time. More generally, it may simply occur that the query executor 120 is tasked with executing a plurality of queries and other operations against the database 114, thereby causing the change operator 124 to wait for access to the source table 118.

Even once the change operator 124 begins executing with respect to the source table 118, a corresponding quantity of time will be required to complete the requested change operations. For example, as described herein, a particular transaction may include one or more queries, operations, statements, or other aspects, many of which are implemented in serial fashion. For example, an input to one statement may require output from a preceding statement. In other examples, there may be other reasons why a particular operation is forced to wait for required data to become available before proceeding. In order to facilitate operations of the change operator 124 over time in these and other scenarios, a record buffer 126 is configured to temporarily store change-relevant data for operations of the change operator 124, during a time period that the change operator 124 may require access thereto in order to process the query and other aspects of the transaction requested by the client 108.

As described in detail below, the RLT manager 102 includes a request handler 128 that is configured to determine a current requirement to capture changes associated with the change operator 124. A built-in change extractor 130 is configured to access the record buffer 126, in order to extract required change data therefrom. An entry generator 132 is thus provided with data necessary to generate an entry within a replication log table (RLT) 134.

By performing these and related operations across a plurality of data changes, queries, and associated transactions, the replication log table 134 serves to capture, replicate, and ultimately propagate changes to the source table 118, in a manner which maintains a consistency of the order in which the associated transactions occurred. Moreover, as also described below, the replication log table 134 may be generated as a relational table that may easily be queried by an otherwise-standard relational interface 135 of the subscriber 122.

For example, as described below with respect to FIGS. 3-5, the replication log table 134 may be accessed through the use of a standard SQL request and/or associated interface. In the simplified example of FIG. 1, the relational interface 135 is illustrated as being implemented at the subscriber 122. However, it will be appreciated that the replication log table 134 may also be accessed by a suitable interface implemented at the database system 104, itself, or at the client 108.

In practice, the request handler 128 may initially be configured to determine whether and when to initiate further operations of the RLT manager 102. For example, the request handler 128 may determine whether the source table 118 is associated with a requirement for data change capture, along with specific requirements of such data change capture. For example, the request handler 128 may determine a manner in which the replication log table 134 is constructed with respect to a particular source table or type of source table, examples of which are provided below with respect to FIGS. 3-5.

Based on the type or aspects of the replication log table 134 being constructed in the particular instance of the RLT manager 102, as determined by the request handler 128, the change extractor 130 may proceed to extract the corresponding type of desired changes from the record buffer 126, while the record buffer exists in the context of the change operator 124 accessing the source table 118. In other words, as referenced above, and described in detail below, the record buffer 126 represents a temporary data store that exists while necessary for the change operator 124 to access the stored data. During this time window that the record buffer exists, the change extractor 130 is configured to initiate and implement extraction of relevant change data therefrom.

Using the extracted change data, the entry generator 132 may proceed to construct the specific type of the replication log table 134 specified by the request handler 128. Once generated, an entry may be temporarily stored within an RLT queue 136, in conjunction with incrementing a count of an RLT counter 138. In this way, as also described in detail below, the change operator 124 (along with, e.g., other change operators of a given transaction) may continue its operations uninterrupted, even when corresponding, resulting RLT entries are not able to be stored immediately within the replication log table 134.

Then, as the entries of the RLT queue 136 are stored within the replication log table 134, the entry generator 132 may decrement the count of the RLT counter 138. Accordingly, the RLT counter 138 may reach a value of 0 once the RLT queue 136 has been emptied of RLT entries. In this way, the RLT manager 102 easily and quickly determines a time of completion of data change capture required for the change operator 124 within the replication log table 134.

Consequently, any operations of the database instance 106 that are required to wait for completion of operations of the RLT manager 102 may be notified to proceed immediately upon such completion. In particular, for example and as described herein, completion of operations of the RLT manager 102 with respect to the change operator 124 may trigger a corresponding transaction commit by the transaction manager 112 with respect to the source table 118.

In this regard, the change extractor 130 and the entry generator 132 may be configured to determine and include a transaction commit identifier, also referred to herein as a transaction (CID), which identifies and specifies a each committed transaction, and a relative order of each committed transaction (e.g., relative to preceding and subsequent transactions). For example, each transaction CID may be stored within a corresponding entry of the replication log table 134. In this way, for example, it is possible for the subscriber 122 to utilize the relational interface 135 to query the replication log table 134 for all entries having a specified, desired transaction commit characteristic. For example, the subscriber 122 may query the replication log table 134 for all relevant transaction commits that occurred before or after a specified time, or within a specified time range, or transaction range.

In the example of FIG. 1, the database system 104 is illustrated as being implemented using at least one computing device 140. As shown, the at least one computing device 140 is illustrated as including at least one processor 142, along with a non-transitory computer readable storage medium 144. Of course, the at least one computing device 140 should be understood to represent one or more computing device of any type suitable to implement the database system 104.

Similarly, the at least one processor 142 should be understood to represent two or more processors executing in parallel to implement the database system 104. Thus, it will be further appreciated that the database system 104 may itself be understood to be implemented in a distributed fashion. Nonetheless, as described in detail below, implementation of the RLT manager 102 within the same database instance 106 as the source table 118 enables a fast and efficient transaction commit process. For example, inclusion of the RLT manager 102 within the database instance 106, and co-located with the source table 118, avoids expensive multi-system synchronist commit overhead cost (such as those associated with the known 2-phase operation).

Finally with respect to FIG. 1, the non-transitory computer readable storage medium 144 should be similarly understood to represent two or more computer memories, possibly of multiple memory types, that may be necessary or helpful in implementing the database system 104. For example, the computer readable storage medium 144 may be utilized to store instructions that are executed by the at least one processor 142 to implement the RLT manager 102, and/or the database system 104, as a whole. Further, the computer readable storage medium 144 should be understood to represent any computer memory suitable to store the record buffer 126, or the replication log table 134.

In various implementations, some of which are referenced below, the database system 104 may represent an in-memory or main memory database system, in which the database 114 is stored using a main memory of the at least one computing device 140. Such in-memory database systems typically use a secondary type of memory for more stable, longer term data storage, such as a memory using disk-based storage. Accordingly, the computer readable storage medium 144 should be understood to represent any of these or related types of computer memory that may be utilized to implement the database system 104.

Figure 2:
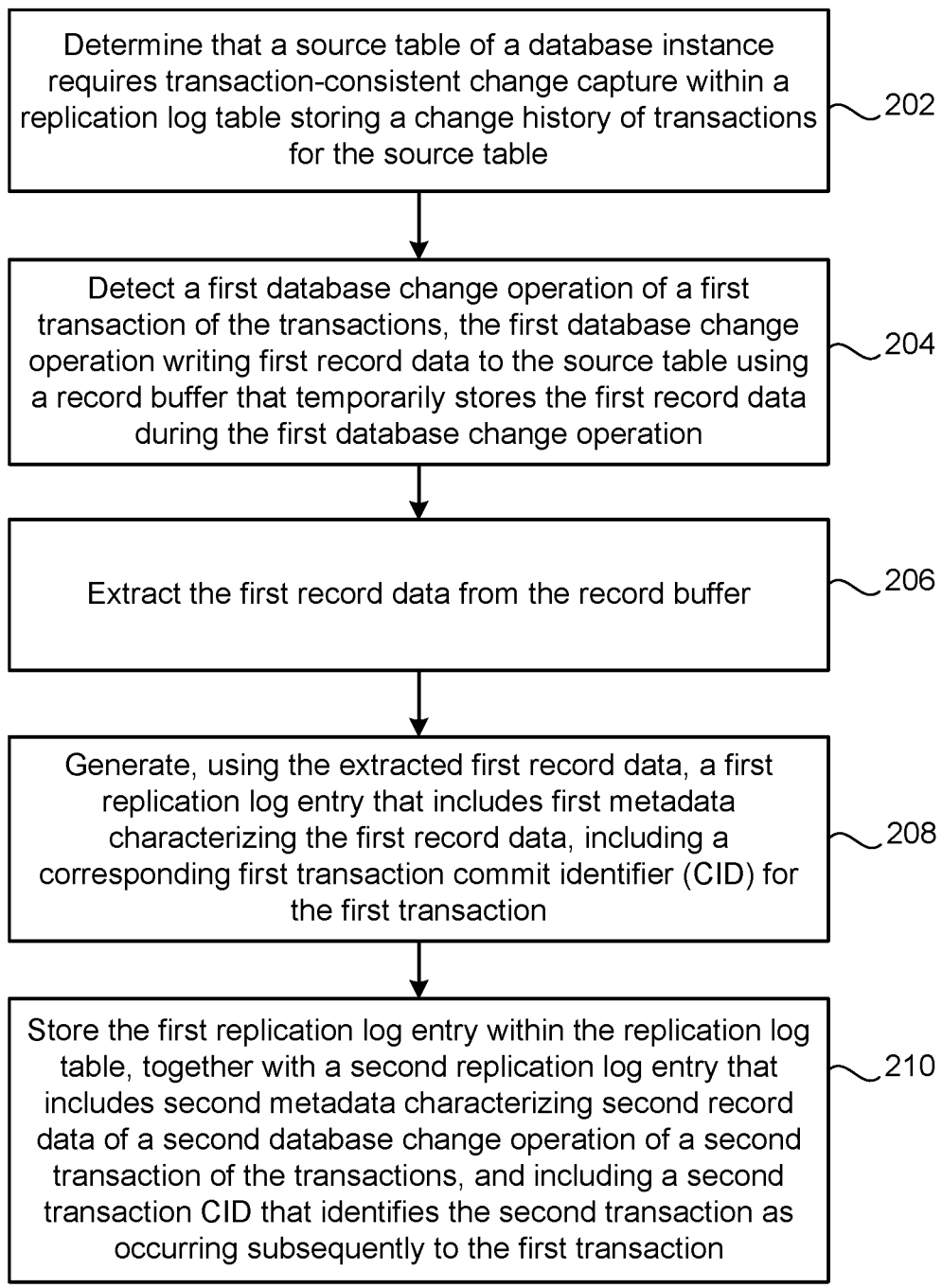
FIG. 2 is a flowchart illustrating example operations of the system for FIG. 1.

FIG. 2 is a flowchart 200 illustrating example operations of the system 100 of FIG. 1. In the example of FIG. 2, operations 202-210 are illustrated as separate, sequential operations. In various implementations, additional or alternative operations or sub-operations may be included, and/or one or more operation or sub-operation may be omitted. In these and other implementations, it may occur that any two or more operations or sub-operations occur in a partially or completely overlapping or parallel manner, or in a nested, iterative, branched, or looped fashion.

In the example of FIG. 2, a source table of a database instance is determined to require transaction-consistent change capture within a replication log table storing a change history of transactions for the source table (202). For example, the request handler 128 of FIG. 1 may be configured to determine that the source table 118 requires such transaction-consistent change capture within the replication log table 134. For example, the request handler 128 may have access to a database or other storage specifying a requirement of the client 108, the subscriber 122, and administrator of the database system 104, or any other relevant, authorized entity that may request or require operations of the RLT manager 102 with respect to change operations associated with the source table 118. In other example implementations, the source table 118 may be associated with a particular table type, or type or characteristic of data, which may be specified with respect to the request handler 128 as requiring transaction-consistent change capture.

A first database change operation of a first transaction of the transactions may be detected, the first database change operation writing first record data to the source table using a record buffer that temporarily stores the first record data during the first database change operation (204). For example, during the change operation of the change operator 124, a corresponding write operation may proceed to write first record data to the source table 118, using the record buffer 126.

The first record data may be extracted from the record buffer (206). For example, the change extractor 134, in response to the corresponding instruction from the request handler 128, may be configured to monitor contents of the record buffer 126. The change extractor may thus be enabled to obtain the first record data from the record buffer 126.

Using the extracted first record data, a first replication log entry may be generated that includes first metadata characterizing the first record data, including a corresponding first transaction commit identifier (CID) for the first transaction (208). For example, the entry generator 132 may generate an entry for the replication log table 134 as described in detail below with respect to FIGS. 3-5, where the generated entry may include the actual content of the record data extracted from the record buffer 126, along with metadata characterizing the first record data and its associated transaction. In other implementations, the generated entry need not include the actual record data, and may instead include only the required metadata, along with a pointer or other identification of the actual record data within the source table 118 itself.

The first replication log entry may be stored within the replication log table, together with a second replication log entry that includes second metadata characterizing second record data of a second database change operation of a second transaction of the transactions, and including a second transaction CID that identifies the second transaction as occurring subsequently to the first transaction (210). For example, the entry generator 132 may be configured to store the generated entry initially within the RLT queue 136, and ultimately inserted within the replication log table 134. By including the first RLT entry together with the first transaction CID and the second RLT entry together with the second transaction CID, the replication log table 134 provides the required transaction-consistent change capture characterizing a change history of transactions with respect to the source table.

Figure 3:
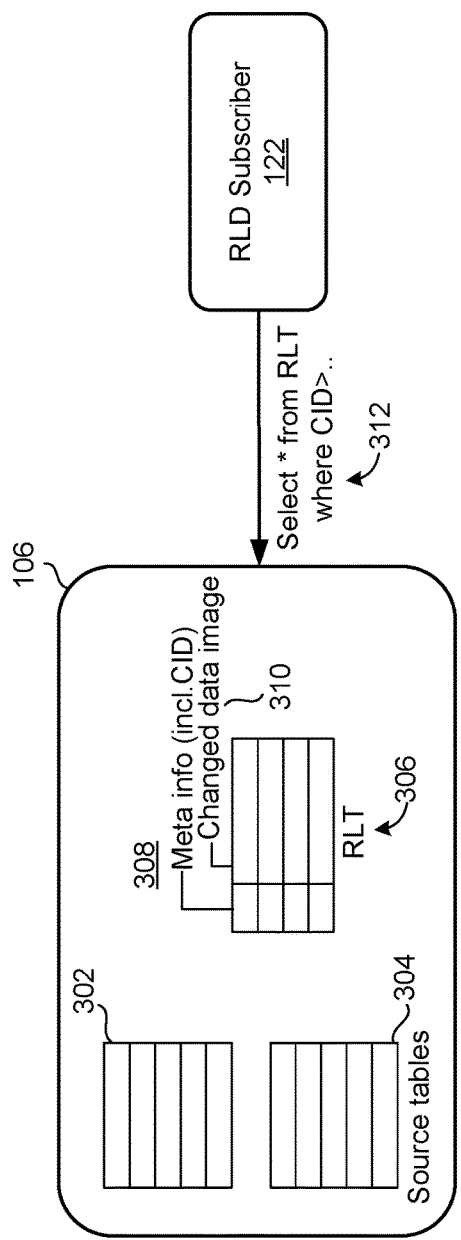
FIG. 3 is a block diagram illustrating a first example implementation of a replication log table of the system of FIG. 1.

FIG. 3 is a block diagram illustrating a first example implementation of the system 100 of FIG. 1. In the example of FIG. 3, the RLT subscriber 122 accesses the database instance 106, as already described with respect to FIG. 1.

In FIG. 3, a source table 302 and a source table 304 generally represent the examples of the source table 118 of FIG. 1, while a replication log table 306 represents a particular example implementation of the replication log table 134 of FIG. 1.

In the RLT 306, meta information 308 is included, which also includes the transaction CID for each stored transaction. Further, a changed data image 310 of the actual data that has been changed as a result of each corresponding change operation is also included within the RLT 306.

In FIG. 3, the meta information 308 may include one or more of the following columns of information characterizing a corresponding transaction. For example, the meta information 308 may include a transaction ID to identify the transaction responsible for the relevant change operation, as well as a statement ID denoting which statement within the transaction made the reference change. The meta information 308 also may include a table ID or table name that indicates which source table has been affected by the change operation. A column for operation type also may be included. For example, the operation type may be indicated as one of insert, update, delete, or erase. In some cases, the operation type may relate to a data definition language (DDL) or table truncate operation, which may, for example, have a schema-level change to the source table(s). In these cases, instead of performing record-level physical materialization, a single logical entry may be generated and inserted into the RLT 306.

The meta information 308 also may include an old row ID, indicating which source record has been deleted by the change in question, where the old row ID would have a null value in the case of an insert operation. A new row ID may indicate which source record has been added by the change, and would have a null value for a delete operation. Finally, as already described, the meta information 308 may also include the transaction CID.

The example of FIG. 3 may be referred to as a full materialization implementation, in which an entire change image and required meta information are materialized and stored into the RLT 306. For example, as described with respect to FIG. 1, the change extractor 130 may be configured to extract the change data from the record buffer 126, and the entry generator 132 may be configured to copy or otherwise materialize the change data, along with the meta information 308, into the replication log table 134/306.

Accordingly, the fully-materialized RLT 306 requires sufficient memory resources to store both the meta information and an entirety of the changed data image 310. Further, the fully-materialized RLT will generally require a corresponding amount of processing resources required to implement the change extractor 130 and the entry generator 132 with respect to fully populating the RLT 306. Further, since each source table record copied from the source tables 306, 308 may have differences, e.g., and record format or length, the data image copied for inclusion within the RLT 306 may need to be encoded into a variable-length binary image, which may require an image interpreter to be used at the RLT subscriber 122.

Advantageously, in the example of FIG. 3, the fully-materialized RLT 306 provides a single access point for the RLT subscriber 122. For example, the RLT subscriber may obtain any desired change data through the use of a simple relational query, such as a relational query 312 (illustrated as "Select * from RLT where CID> . . . " in FIG. 3.

Figure 4:
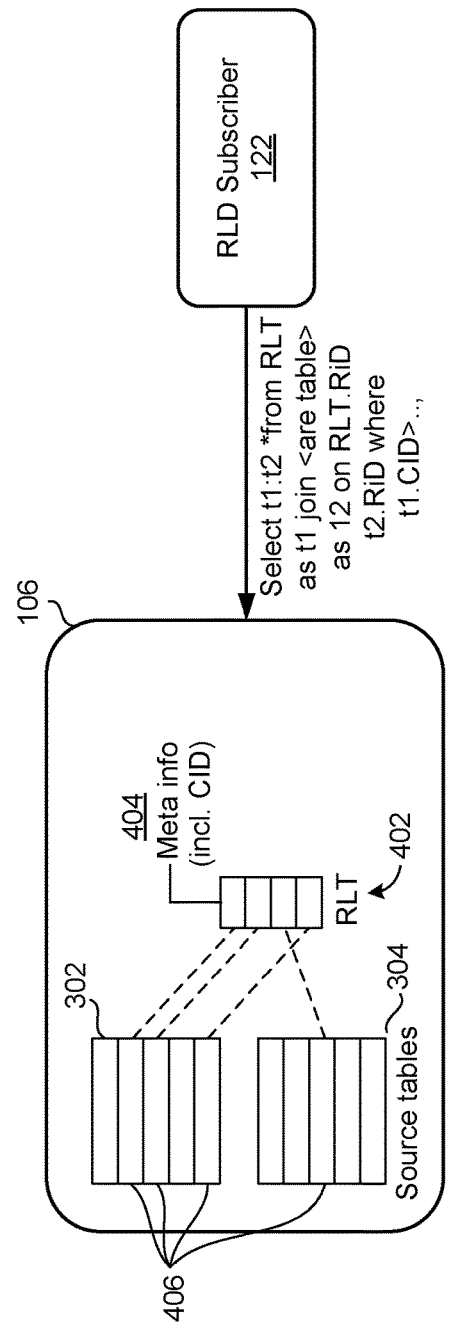
FIG. 4 is a block diagram of a second example implementation of the replication log table of FIG. 1.

FIG. 4 is a block diagram illustrating a second example implementation of the system 100 of FIG. 1. In the example of FIG. 4, an RLT 402 is only partially materialized from the change data captured by the change extractor 130.

That is, as shown, the RLT 402 includes the meta information 404 materialized by the change extractor 130 and the entry generator 132, without requiring materialization of the changed image of the change data itself. Instead, as shown, the changed image may be indirectly accessed, using the source tables 302, 304. For example, record ID information stored within the meta information 404 of the RLT 402 may be used to store corresponding, individual records 406 of the source tables 302, 304.

Thus, in order to access desired change data, the subscriber 122 may simply use the relational interface 135 to issue a query 408, shown in FIG. 4 as "Select t1:t2*from RLT as t1 join <are table> as 12 on RLT.RiD t2.RiD where t1.CID> . . . ,". As shown, the RLT subscriber 122 may retrieve any desired change history simply by joining the RLT 402 and necessary, corresponding source table 302 or 304, as shown in the query 408.

Figure 5:
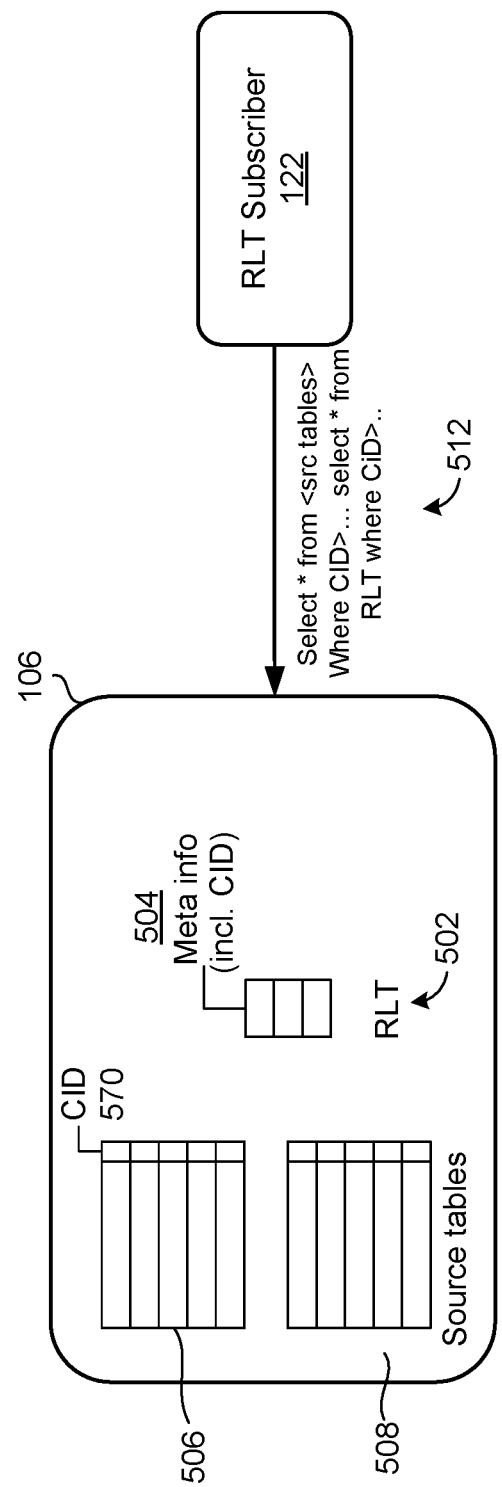
FIG. 5 is a block diagram of a third example implementation of the replication log table of FIG. 1.

FIG. 5 is a block diagram illustrating a third example implementation of the system 100 of FIG. 1. In the example of FIG. 5, an implementation of an RLT 502 is illustrated, in which meta information 504 again includes the transaction CID, as illustrated. As further illustrated, with respect to source tables 506, 508, a column 510 for the transaction CID is also included.

In response to operations such as delete, update, or DDL, the RLT 502 is updated with corresponding, generated entries, using an appropriate query generated by the RLT subscriber 122 that leverages the availability of the CID column 510. However, in the example, it is not necessary to notify/update the RLT directly in response to an insert operation, or to capture changes associated with an insert operation in the RLT. Instead, the new data resulting from such an insert operation will simply reside within the appropriate source table, and the RLT subscriber 122 may simply obtain the corresponding inserted data at a time of querying that source table.

In other words, for example, when the RLT subscriber 122 retrieves desired change history via the RLT 502, the corresponding record may be retrieved by accessing the RLT 502 to find the inserted record by querying the CI in the column 510. Thus by additionally maintaining the CID column 510 for each source table, an inserted record may be directly retrieved from the source tables, using the query 512, in which a record(s) with a CID value larger than a last-retrieved CID value is obtained, and the newly-inserted record is identified from the relevant source table.

Accordingly, of the three example implementations of FIGS. 3, 4, and 5, the example RLT 502 of FIG. 5 will generally consume the least amount of memory space, as well as minimizing an amount of processing resources to execute copy operations to the memory space. On the other hand, in some scenarios, it may be undesirable or difficult to add the CID column 510 to an existing source table schema.

The partial materialization option of the example of FIG. 4 also requires fewer memory/processing resources then the example of FIG. 3. However, for both of the examples of FIGS. 4 and 5, the subscriber 122 (representing multiple subscribers) may incur potential contention with online source transactions, due to the need to access the various source tables, themselves.

Meanwhile, the example implementation of FIG. 3 provides the highest consumption of resources, but is likely to provide the fastest and most direct access to desired change data, as experienced by the RLT subscriber 122. Thus, selection between one or more of the example implementations of FIGS. 3-5, or variations thereof, should be understood to require a suitable design choice on the part of an administrator or other designer of the system 100 of FIG. 1, and taking into account a particular use context of the implementation being designed.

Figure 6:
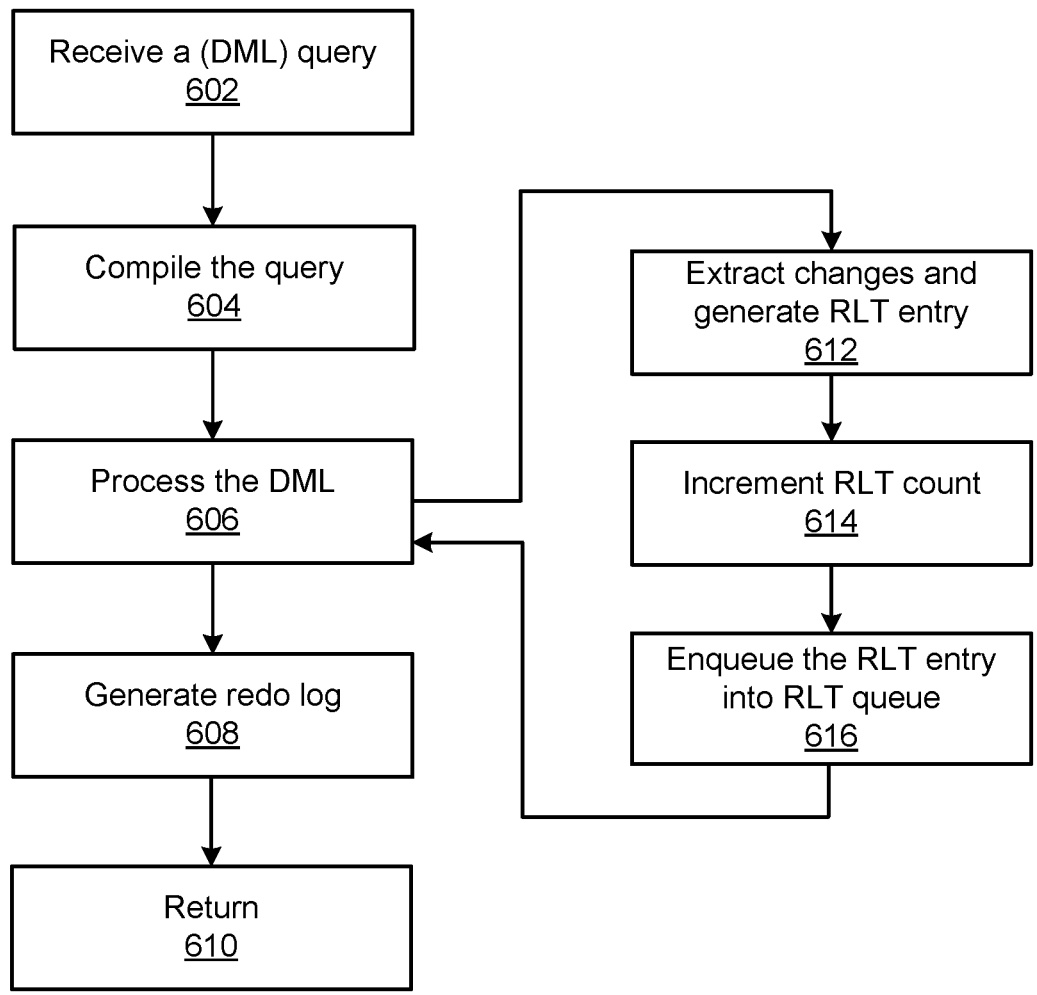
FIG. 6 is a flowchart illustrating example change extraction techniques used in the system of FIG. 1.

FIG. 6 is a flowchart illustrating example operations of the change extractor 130 and the entry generator 132 of FIG. 1. FIG. 6 illustrates operations 602-610, which are example operations associated with a call path performed during a typical, example write operation, such as a DML query. In the example, such a DML query is received (602), whereupon the received query may be compiled (604), such as at the session layer 110.

The DML may then be processed (606), such as by the query executor 120, using the change operator 124 and the record buffer 126 of FIG. 1. Further in typical, example implementations, a redo log may be generated (608), which is used in case of system failure. The process flow may then return (610), so as, for example, to receive a second DML.

In conjunction with the DML processing (606), the change extractor 130 and entry generator 132 may proceed to extract required changes and generate a corresponding RLT entry (612). The entry generator 132 may further be configured to increment the RLT counter 138 by one (614) and in queue the RLT entry into the RLT queue 136 (616).

Thus, FIG. 6 illustrates that the described change extraction and entry generation operations are called at a time of DML processing (606). The RLT counter 138 may be implemented as a per-transaction counter, which may be initialized when the relevant transaction begins.

It will be appreciated with respect to the three example implementations of FIGS. 3, 4, and 5 that, depending on a nature of the RLT being implemented, contents of the captured changes may vary, while maintaining the same or similar execution path illustrated with respect to FIGS. 6-10. For the example of FIG. 5, operations 612-616 may not be required for source table insertion operations, as described above with respect to FIG. 5.

Figure 7:
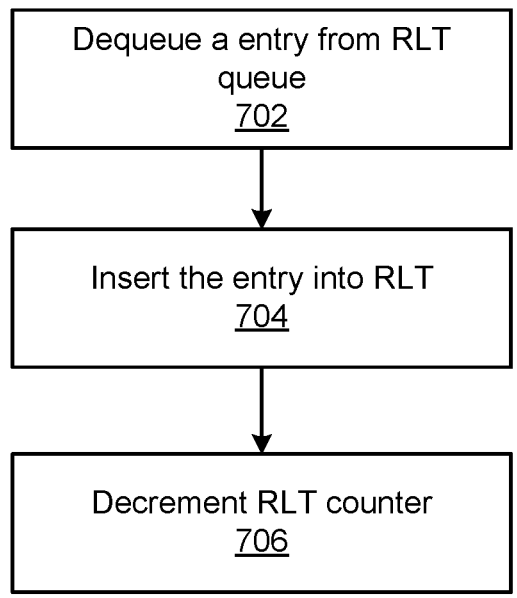
FIG. 7 is a flowchart illustrating entry insertion techniques for the replication log table of FIG. 1.

FIG. 7 is a flowchart illustrating an example insert operation for the replication log table 134 of FIG. 1, or any of the RLTs 306, 402, 502 of FIGS. 3, 4, 5, respectively. As shown, the entry generator 132 may proceed by de-queuing a particular entry from the RLT queue 136 (702). The de-queued entry may then be inserted into the RLT 134 (704), and the RLT counter 138 may be decremented.

Figure 8:
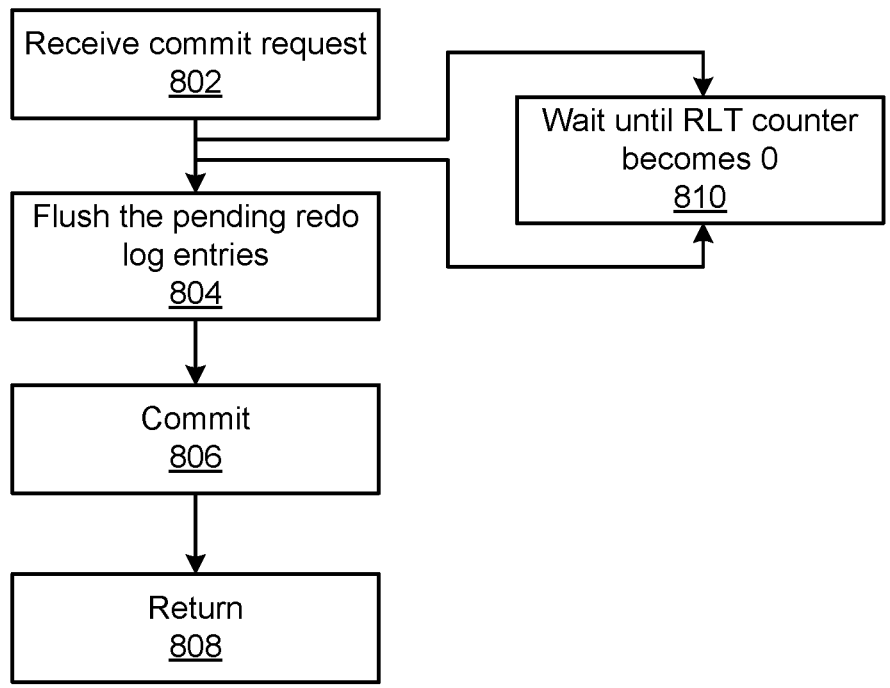
FIG. 8 is a flowchart illustrating a timing of updates to the replication log table of FIG. 1, in the context of an individual transaction commit.

FIG. 8 is a flowchart illustrating an example transaction commit operation in accordance with the system 100 of FIG. 1. In the example of FIG. 8, the following receipt of a commit request (802), the pending redo log entries may be flushed (804). The transaction may then commit (806), and the overall process flow may return (808) to proceed with a subsequent transaction. As shown in FIG. 8, following the commit request being received (802), the process flow waits until the RLT counter 138 has decremented to the value of 0 (810), before proceeding to flush the pending redo log entries (804).

Figure 9:
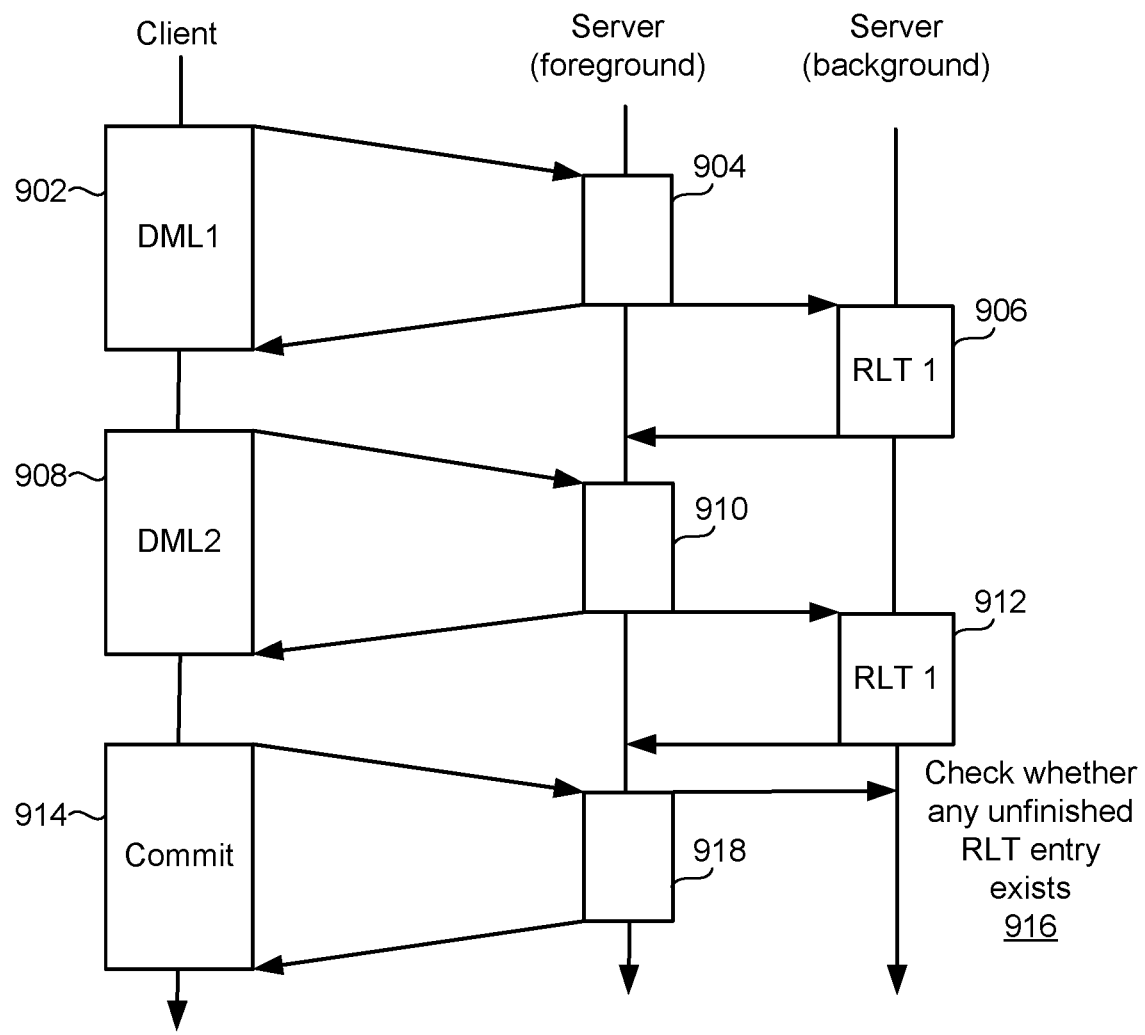
FIG. 9 is a timing diagram illustrating a relative timing of operations of the examples of FIGS. 6-8.

FIG. 9 is a timing diagram illustrating a timing of composite operations of the flowcharts of FIGS. 6-8. In the example of FIG. 9, a first DML 902 is received from the client and undergoes execution 904 in a foreground server process. A corresponding RLT entry 906 is extracted, generated, en-queued/de-queued, and counted in a background server process, and in conjunction with the described operations of FIGS. 6 and 7.

Similarly, a second DML 908 may be received and executed 910 in a foreground server process. The corresponding RLT entry 912 may thus be handled for the DML 908, as just described with respect to the RLT entry 906.

As described with respect to FIG. 8, upon receipt of a transaction commit request 914, it may be necessary to wait (916) in the event that any unfinished RLT entry remains. As also described with respect to FIG. 8, once the RLT counter 138 reaches a value of 0, the transaction commit execution 918 may proceed in the foreground server process.

For example, the CID itself may be determined at a time of transaction commit, which is the very last step of a transaction execution. To associate the determined CID value into already-generated record images of the transaction, the following mechanism may be used. For example, an appropriate object may be created for record versions created by a single/same transaction. The object may be configured to store the CID value of the transaction, and also to link to the record versions created by the transaction. Before the transaction commits, the CID value may be set as null, and when the CID value of the transaction is determined, the value may be written to the object in an atomic way. The CID value may then be copied back to the record versions asynchronously in a background process. From the perspective of record versions, this asynchronous copy operation of CID values may be used in conjunction with a link to the corresponding object. When the CID value of a record version is needed and the CID value itself is not yet copied to the record version, the value can be retrieved using the link. In the multi-version concurrency control (MVCC) storage architecture of SAP HANA, an example of such an object is implemented as the "TransContext" object.

It is possible that an RLT-involved transaction may encounter a rollback event, such as when a multi-statement change operation encounters an error prior to a final statement (and transaction commit) being reached. Then, in addition to the changes at the source tables, the changes at the corresponding RLT table may be rolled back. Any pending entry in the RLT queue for the transaction may be deleted from the corresponding RLT queue, and any ongoing RLT operation for the transaction may be cancelled.

Figure 10:
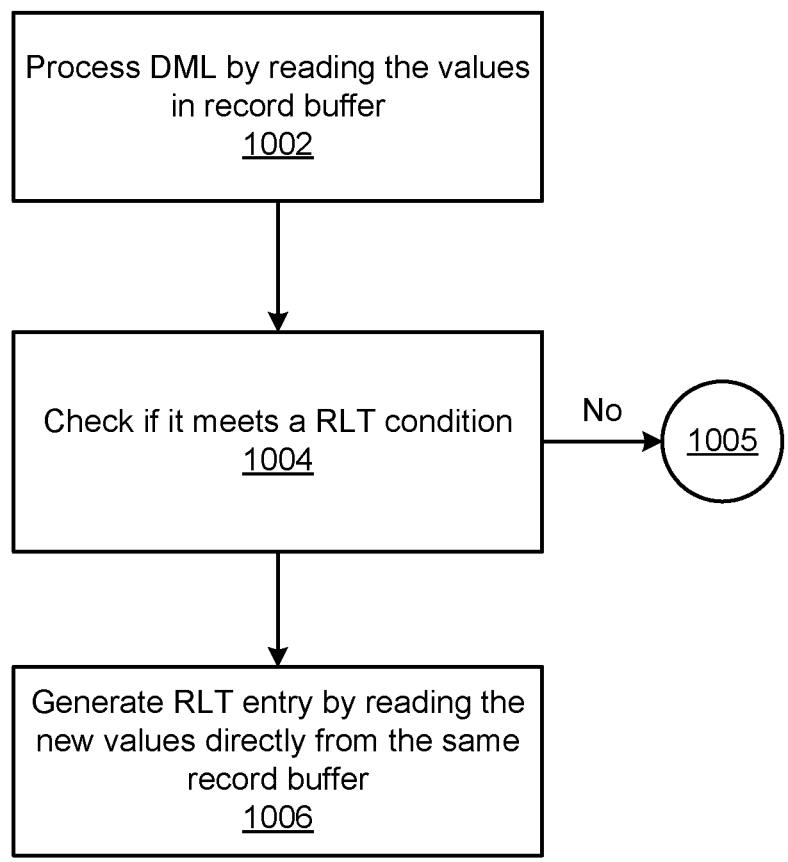
FIG. 10 is a flowchart illustrating an example scenario for data change extraction and associated generation of an entry for the replication log table of FIG. 1.

FIG. 10 is a flowchart illustrating more detailed example implementations of the change extractor 130 and the entry generator 132 of FIG. 1, such as may be executed during the extraction/generation operation 612 of FIG. 6. Thus, for example, the operations 1002, 1004, 1006 may be understood to be implemented, e.g., within the background server RLT processing 906 or 912 of FIG. 9.

FIGS. 8 and 9 illustrate a model of optimistic synchronous change propagation, in which a write operation (e.g., DML operation) proceeds without waiting for captured changes to be copied to the relevant RLT, but the transaction commit waits for all pending RLT updates to be completed. In this way, consistency between source table changes and corresponding RLT entries are assured, without adding delays to individual write/DML operations. Even if a commit operation delay occurs, such a wait incurred by RLT background processing will generally be relatively minimal (and/or may be hidden) in many multi-statement and client-server architectures, such as may be used to implement the system 100 of FIG. 1.

In the example of FIG. 10, a received DML may be processed, including reading newly-added values from the record buffer 126 (1002). If the read value does not need a previously-designated RLT condition (1004), then the process may end (1005). Otherwise, a new, corresponding RLT entry may be generated, including reading the new values directly from the record buffer 126 (1006).

Thus, in the examples of FIGS. 1-10, techniques are described for using an in-database, built-in change extractor, such as the change extractor 130, which may be implemented as an extension of a DML operator, such as the change operator 124. Captured changes may thus be copied and stored to a system-internal table, such as the various RLT implementations described herein, representing a queryable, relational table. Accordingly, an external application program (represented by RLT subscriber 122) can conveniently retrieve the change history, e.g., by using plain SQL interfaces. In addition, to enable any external application program reading the change history in a transaction-consistent order from RLT, each record in RLT stores the CID of the transaction that changed the record.

Further, in the various examples described herein, the various RLT implementations are co-located with the same database instance that includes the source tables. Accordingly, expensive multi-system synchronous commit overhead costs may be avoided (such as the expensive two-phase commit operation referenced above). Even when the source system is a distributed database system, in which tables may be distributed to multiple database instances, each database instance may be configured to maintain its own local RLT instance for source tables located in that database instance. It is also possible to maintain multiple RLT instances within a single database instance, e.g., to avoid a single point of contention for RLT subscriber access.

By way of more specific example of RLT subscriber scenarios, the RLT subscriber 122 may periodically check for (and retrieve) any new record in the RLT 134. In order to ensure transactional ordering of processed RLT entries, one method is simply to use a single subscriber per source table. For further parallelism, it is also possible to assign a separate subscriber per table. When there is only one dedicated subscriber, an RLT truncation can be driven by the sole subscriber such that the RLT subscriber 122 deletes the processed RLT records using SQL statements. When there are multiple subscribers, an additional read counter may need to be added to the RLT structure. In such cases, each subscriber increments the read counter on its processing and then, if the read counter reaches a certain value, a background operation can be used to delete the corresponding record.

The described techniques improve upon existing techniques for transaction-consistent change-ordered database capture. For example, some existing techniques use an SQL trigger at a receiving application, for each relevant DML operation and source table. These techniques involve performance overhead, as well as imposing a burden on application programmers to write and maintain the SQL triggers. Further, the SQL trigger may need to reconstruct a record image when updating a target table for replicated changes, using parameter values obtained through the trigger code, which also imposes additional overhead.

Although in-database replication methods exist, existing versions are generally only operable within a single (or multiple homogeneous) database system(s). Further, redo logs, such as referenced above, may be read in FIG. 6 at operation 608, may be read, and the results may be converted to a sequence of SQL statements. However, a required conversion logic may be heavily dependent on a format of the particular type of redo log being used, thereby adding a burden of creating and maintaining consistency/compatibility between the conversion logic and the particular redo log format. Further, the conversion logic may require an additional disk operation to read from the redo log, thereby lengthening a time required for replication propogation.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or median of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
at least one processor; and
a memory communicatively coupled to the at least one processor, the memory storing instructions which, when executed, cause the at least one processor to perform operations comprising:
  determine that a source table of a database instance requires transaction-consistent change capture within a replication log table storing a change history of transactions for the source table;
  detect a first database change operation of a first transaction of the transactions, the first database change operation writing first record data to the source table using a record buffer that temporarily stores the first record data during the first database change operation;
  extract the first record data from the record buffer;
  generate, using the extracted first record data, a first replication log entry that includes first metadata characterizing the first record data, including a corresponding first transaction commit identifier (CID) for the first transaction; and
  store the first replication log entry within the replication log table.

2. The system of claim 1, wherein the instructions, when executed, cause the at least one processor to perform operations comprising:
storing the first replication log entry within the replication log table, together with a second replication log entry that includes second metadata characterizing second record data of a second database change operation of a second transaction of the transactions, and including a second transaction CID that identifies the second transaction as occurring subsequently to the first transaction.

3. The system of claim 1, wherein the instructions, when executed, cause the at least one processor to perform operations comprising:
generating the first replication log entry including the first record data and the first metadata.

4. The system of claim 3, wherein the instructions, when executed, cause the at least one processor to perform operations comprising:
providing the first replication log entry to a subscriber to the replication log table for the source table, and based on a relational query specifying the replication log table.

5. The system of claim 1, wherein the instructions, when executed, cause the at least one processor to perform operations comprising:
generating the first replication log entry, including causing the at least one computing device to:
generating the first replication log entry including the first metadata; and
storing the first replication log entry in the replication log table, without copying the first record data to the replication log table.

6. The system of claim 5, wherein the instructions, when executed, cause the at least one processor to perform operations comprising:
providing the first record data from the source table to a subscriber to the replication log table for the source table, in response to a relational query and based on the replication log table, the first metadata, and the source table.

7. The system of claim 1, wherein the instructions, when executed, cause the at least one processor to perform operations comprising:
generating the first replication log entry including the first metadata; and
storing the first transaction CID within a transaction CID column of the source table.

8. The system of claim 7, wherein the instructions, when executed, cause the at least one processor to perform operations comprising:
providing the first record data from the source table to a subscriber to the replication log table for the source table, in response to a relational query and based on the replication log table, the first metadata, and the first transaction CID within the transaction CID column of the source table.

9. The system of claim 1, wherein the instructions, when executed, cause the at least one processor to perform operations comprising:
generating a second replication log entry that includes second metadata characterizing second record data of a second database change operation of the first transaction of the transactions, without waiting for completion of storage of the first replication log entry; and
waiting for storage of the first replication log entry and the second replication log entry to the replication log table before proceeding with a transaction commit of the first transaction of the transactions.

10. The system of claim 1, wherein the source table and the replication log table are both located within the database instance.

11. A computer-implemented method, comprising:
detecting a database change operation of a database transaction, the database change operation writing record data to a source table;
extracting the record data during the database change operation;
storing the record data within a queue;
generating, using the record data from the queue, a first replication log entry that includes metadata characterizing the record data, including a corresponding transaction commit identifier (CID) for the database transaction;
storing the first replication log entry within a replication log table;

receiving a relational query for the replication log table, specified using the transaction CID; and providing the record data in response to the relational query, including specifying a transaction order of the database transaction relative to at least one other database transaction, using the transaction CID.

12. The computer-implemented method of claim 11, further comprising:

accessing the record data from a record buffer used by the database change operation to temporarily store the record data while writing the record data to the source table.

13. The computer-implemented method of claim 11, further comprising:

extracting second record data of a second database change operation of the database transaction, during the second database change operation;

generating a second replication log entry that includes second metadata characterizing the second record data;

storing the second replication log entry within the queue, without waiting for completion of storage of the first replication log entry or the second replication log entry; and waiting for the first replication log entry and the second replication log entry to be written from the queue to the replication log table before proceeding with a transaction commit of the database transaction.

14. A system comprising:

at least one processor; and a memory communicatively coupled to the at least one processor, the memory storing instructions which, when executed, cause the at least one processor to perform operations comprising:

detecting a database change operation of a database transaction, the database change operation writing record data to a source table;

extracting the record data during the database change operation;

storing the record data within a queue;

generating, using the record data from the queue, a first replication log entry that includes metadata characterizing the record data, including a corresponding transaction commit identifier (CID) for the database transaction;

storing the first replication log entry within a replication log table;

receiving a relational query for the replication log table, specified using the transaction CID; and providing the record data in response to the relational query, including specifying a transaction order of the database transaction relative to at least one other database transaction, using the transaction CID.

15. The system of claim 14, wherein the instructions, when executed, cause the at least one processor to perform operations comprising:

accessing the record data from a record buffer used by the database change operation to temporarily store the record data while writing the record data to the source table.

16. The system of claim 14, wherein the instructions, when executed, cause the at least one processor to perform operations comprising:

extracting second record data of a second database change operation of the database transaction, during the second database change operation;

generating a second replication log entry that includes second metadata characterizing the second record data;

storing the second replication log entry within the queue, without waiting for completion of storage of the first replication log entry or the second replication log entry; and waiting for the first replication log entry and the second replication log entry to be written from the queue to the replication log table before proceeding with a transaction commit of the database transaction.

* * * * *